United States Patent
Il et al.

(10) Patent No.: US 11,142,661 B2
(45) Date of Patent: Oct. 12, 2021

(54) INK JET RECORDING METHOD

(71) Applicant: KAO CORPORATION, Tokyo (JP)

(72) Inventors: Tomoaki Il, Yokohama (JP); Isao Tsuru, Kinokawa (JP); Norihiro Yoshida, Inagi (JP); Yoshiharu Niizeki, Mitaka (JP); Jun Tairadate, Inagi (JP); Kimiya Yamada, Akishima (JP); Hideki Sakai, Tachikawa (JP)

(73) Assignee: KAO CORPORATION, Tokyo (JP)

( * ) Notice: Subject to any disclaimer, the term of this patent is extended or adjusted under 35 U.S.C. 154(b) by 0 days.

(21) Appl. No.: 16/626,215

(22) PCT Filed: Jun. 15, 2018

(86) PCT No.: PCT/JP2018/022935
§ 371 (c)(1),
(2) Date: Dec. 23, 2019

(87) PCT Pub. No.: WO2019/009047
PCT Pub. Date: Jan. 10, 2019

(65) Prior Publication Data
US 2020/0123401 A1    Apr. 23, 2020

(30) Foreign Application Priority Data
Jul. 5, 2017  (JP) .............................. JP2017-132161

(51) Int. Cl.
*C09D 11/322* (2014.01)
*B41J 11/00* (2006.01)
(Continued)

(52) U.S. Cl.
CPC ............ *C09D 11/322* (2013.01); *B41J 11/002* (2013.01); *C09D 11/326* (2013.01); *C09D 11/40* (2013.01)

(58) Field of Classification Search
CPC ...... B41J 11/002; C09D 11/326; C09D 11/40; C09D 11/322
See application file for complete search history.

(56) References Cited

U.S. PATENT DOCUMENTS

| 5,286,286 A | 2/1994 | Winnik et al. |
| 6,312,123 B1 | 11/2001 | Codos et al. |

(Continued)

FOREIGN PATENT DOCUMENTS

| CN | 1359982 A | 7/2002 |
| CN | 1377313 A | 10/2002 |

(Continued)

OTHER PUBLICATIONS

International Search Report (PCT/ISA/210) issued in PCT/JP2018/022935, dated Jul. 31, 2018.
(Continued)

*Primary Examiner* — Lamson D Nguyen
(74) *Attorney, Agent, or Firm* — Birch, Stewart, Kolasch & Birch, LLP

(57) ABSTRACT

The present invention relates to an ink-jet printing method using an apparatus including a printing means for ejecting a black ink to a printing substrate to print characters or images on the printing substrate, and a drying means disposed on a downstream side of a transportation direction of the printing substrate, in which the printing substrate is a label printing substrate; the black ink is a water-based composite black ink; the water-based composite black ink contains a composite black pigment containing carbon black, and a content of the carbon black in the composite black pigment is not more than 25% by mass; and the drying means is an infrared heater for heating the water-based composite black ink ejected onto the printing substrate to a temperature of not lower than 95° C. and not higher than 125° C. According to the ink-jet printing method of the present invention, it is
(Continued)

possible to obtain a good printed material that is free of color migration or deformation of a printing substrate even when printed on a label printing substrate.

8 Claims, 1 Drawing Sheet

(51) Int. Cl.
*C09D 11/326* (2014.01)
*C09D 11/40* (2014.01)

(56) References Cited

U.S. PATENT DOCUMENTS

| | | | |
|---|---|---|---|
| 9,579,884 B2* | 2/2017 | Matsumura | H04N 1/6025 |
| 9,802,425 B2* | 10/2017 | Seki | B41J 2/21 |
| 10,618,308 B2* | 4/2020 | Matsumoto | B41J 2/21 |
| 2001/0038408 A1 | 11/2001 | Codos et al. | |
| 2002/0005870 A1 | 1/2002 | Codos et al. | |
| 2002/0032252 A1 | 3/2002 | Ishizuka | |
| 2002/0129739 A1 | 9/2002 | Yanagimoto et al. | |
| 2003/0231234 A1 | 12/2003 | Ushirogouchi et al. | |
| 2004/0069183 A1 | 4/2004 | Kamoto et al. | |
| 2005/0168553 A1 | 8/2005 | Ushirogouchi et al. | |
| 2005/0168556 A1 | 8/2005 | Ushirogouchi et al. | |
| 2005/0250869 A1 | 11/2005 | Claes et al. | |
| 2006/0030640 A1 | 2/2006 | Tsuru et al. | |
| 2006/0274135 A1 | 12/2006 | Ushirogouchi et al. | |
| 2006/0274136 A1 | 12/2006 | Ushirogouchi et al. | |
| 2007/0279468 A1 | 12/2007 | Kinas et al. | |
| 2008/0072788 A1 | 3/2008 | Okuda et al. | |
| 2008/0085996 A1 | 4/2008 | Kuvshinov et al. | |
| 2009/0263632 A1 | 10/2009 | Kojima et al. | |
| 2010/0196673 A1 | 8/2010 | Nagashima et al. | |
| 2010/0309260 A1 | 12/2010 | Hakiri et al. | |
| 2012/0092428 A1 | 4/2012 | Ganapathiappan et al. | |
| 2012/0247365 A1 | 10/2012 | Lussier | |
| 2013/0050331 A1 | 2/2013 | Kaeriyama et al. | |
| 2013/0050366 A1 | 2/2013 | Sasada et al. | |
| 2016/0289471 A1 | 10/2016 | Fujii | |
| 2017/0114234 A1 | 4/2017 | Konda | |
| 2020/0123401 A1 | 4/2020 | Il et al. | |

FOREIGN PATENT DOCUMENTS

| | | | |
|---|---|---|---|
| CN | 1511898 | A | 7/2004 |
| CN | 1689810 | A | 11/2005 |
| CN | 1693383 | A | 11/2005 |
| CN | 1730575 | A | 2/2006 |
| CN | 101321835 | A | 12/2008 |
| CN | 101460577 | A | 6/2009 |
| CN | 101925662 | A | 12/2010 |
| CN | 102803409 | A | 11/2012 |
| CN | 102936434 | A | 2/2013 |
| CN | 102952426 | A | 3/2013 |
| CN | 103459523 | A | 12/2013 |
| CN | 106009921 | A | 10/2016 |
| CN | 106133074 | A | 11/2016 |
| CN | 110799346 | A | 2/2020 |
| EP | 0719 654 | A1 | 7/1996 |
| JP | 2000-345079 | A | 12/2000 |
| JP | 2002-97395 | A | 4/2002 |
| JP | 2005-298757 | A | 10/2005 |
| JP | 2008-75031 | A | 4/2008 |
| JP | 2009-6485 | A | 1/2009 |
| JP | 2009-56753 | A | 3/2009 |
| JP | 2009-83267 | A | 4/2009 |
| JP | 2013-47311 | A | 3/2013 |
| JP | 2014-8724 | A | 1/2014 |

OTHER PUBLICATIONS

Chinese Office Action and Search Report for Chinese Application No. 201880041882.2, dated Dec. 21, 2020.

Hu et al., "Effect of Carbon Black on Performance of Polyurethane Acrylate arid Epoxy Acrylate," Paint & Coatings Industry, vol. 46, No. 2, Feb. 2016, 7 pages total, with an English abstract.

Extended European Search Report for European Application No. 16827474.0, dated Mar. 5. 2021.

* cited by examiner

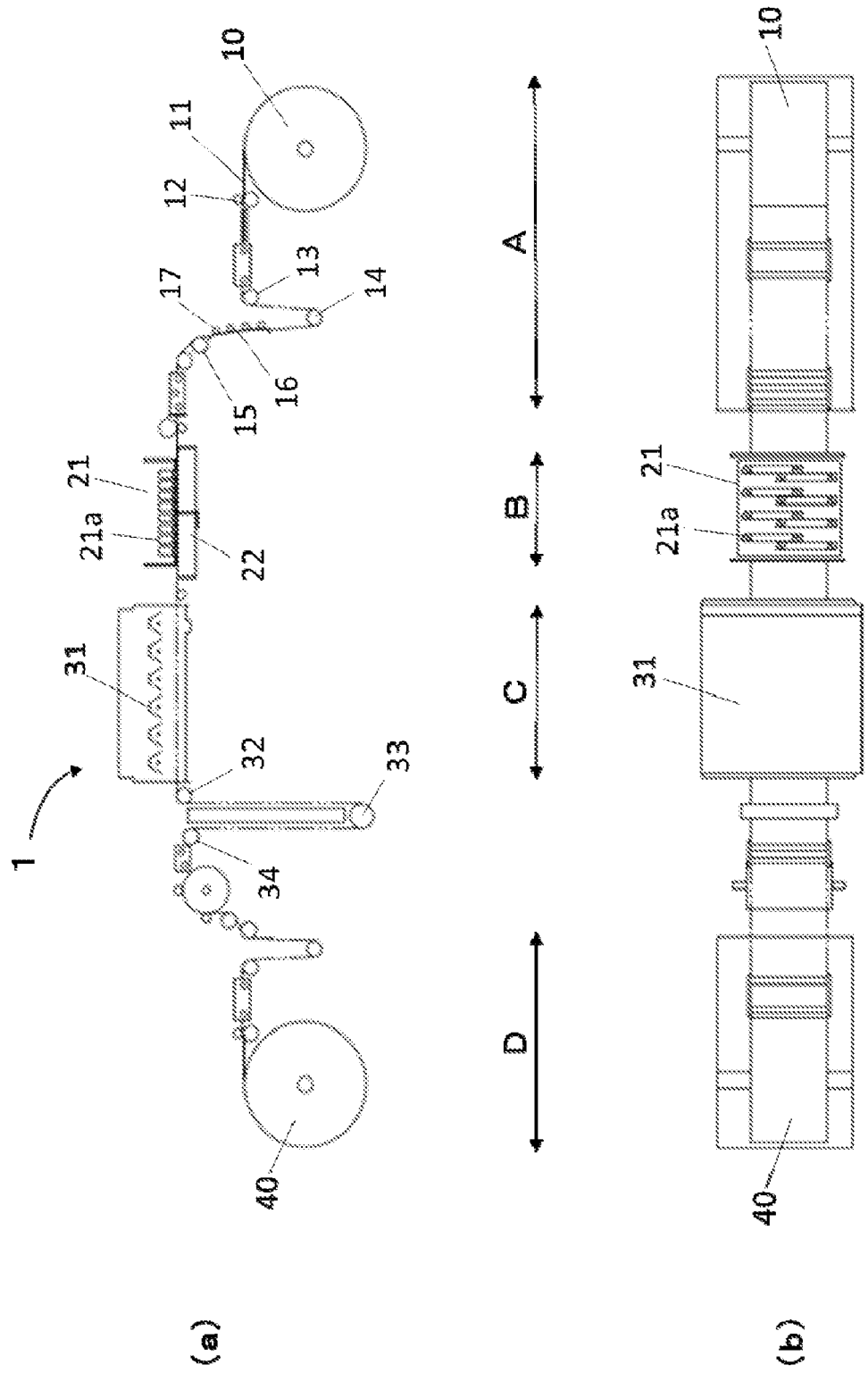

INK JET RECORDING METHOD

FIELD OF THE INVENTION

The present invention relates to an ink-jet printing method.

BACKGROUND OF THE INVENTION

In ink-jet printing methods, droplets of ink are directly ejected onto a printing medium from very fine nozzles and allowed to adhere to the printing medium to obtain characters or images printed thereon. The ink-jet printing methods have now been employed not only in printing applications for ordinary consumers, but also recently in commercial and industrial printing applications because of various advantages such as easiness of full coloration and suitability for preparing a small number and many kinds of printed materials, etc.

In the commercial and industrial printing applications, for the purpose of enhancing productivity, there has been proposed a high-speed ink-jet printing method in which a roll-shaped printing medium is scanned by a so-called single pass printing system with such a construction that a linear stationary print head capable of printing characters or images over a whole width of the printing medium is provided to complete the printing only by passing the printing medium underneath the print head one time.

For example, JP 2014-8724A (Patent Literature 1) discloses a label printer that includes a transportation mechanism for transporting a label paper formed of an elongated release paper and labels adhered onto the release paper at predetermined constant intervals, a head unit equipped with a plurality of line-type print heads from which an ink is ejected to the respective labels, a head unit moving mechanism, and a release mechanism for peeling off the respective labels from the release paper.

In addition, there have been proposed ink-jet printing methods in which a composite black ink that contains a plurality of chromatic pigments is used as a black ink.

For example, JP 2000-345079A (Patent Literature 2) discloses an ink-jet printing method using a black ink composition that contains carbon black, a magenta pigment, a cyan pigment and a yellow pigment at a weight ratio of 1:0.01 to 0.5:0.01 to 0.5:0.01 to 0.5.

JP 2013-47311A (Patent Literature 3) discloses an ink set containing a black water-based ink that contains carbon black, at least one coloring pigment selected from the group consisting of a magenta pigment and a cyan pigment, a water-soluble polymerizable compound and a polymerization initiator, in which a content of the carbon black in the ink is not more than 70% by mass on the basis of a total amount of the whole pigments contained in the ink, as well as an ink-jet printing method. In addition, in Examples of JP 2013-47311A, there is described the ink containing the carbon black in an amount of not less than 50% by mass on the basis of a total amount of the whole pigments.

SUMMARY OF THE INVENTION

The present invention relates to an ink-jet printing method using an apparatus including a printing means for ejecting a black ink to a printing substrate to print characters or images on the printing substrate, and a drying means disposed on a downstream side of a transportation direction of the printing substrate, in which the printing substrate is a label printing substrate; the black ink is a water-based composite black ink; the water-based composite black ink contains a composite black pigment containing carbon black, and a content of the carbon black in the composite black pigment is not more than 25% by mass; and the drying means is an infrared heater for heating the water-based composite black ink ejected onto the printing substrate to a temperature of not lower than 95° C. and not higher than 125° C.

BRIEF DESCRIPTION OF THE DRAWING

FIG. 1 is a schematic view showing an embodiment of an internal structure of an ink-jet printing apparatus used in the present invention, in which (a) is a front view of the apparatus, and (b) is a plan view of the apparatus.

DETAILED DESCRIPTION OF THE INVENTION

In the high-speed printing for printing characters or images on a label printing paper using a water-based ink, take-up work or superposition work of the paper is needed, and it has been therefore required to provide technologies for enhancing a drying velocity of the ink. In consequence, it is considered that the use of a drying system for irradiating infrared rays to the ink on the paper immediately after printing is effective.

However, organic pigments such as a yellow pigment, a magenta pigment and a cyan pigment which are used for chromatic color printing are different in absorption of infrared rays from carbon blacks used for black color printing. For this reason, the irradiation of infrared rays having a minimum thermal energy capable of drying black color portions of the printed characters or images which are more likely to absorb the infrared rays tends to be insufficient to dry chromatic color portions thereof. On the contrary, the irradiation of the infrared rays having a high thermal energy enough to dry the chromatic color portions tends to heat the black color portions to an extremely high temperature. The rapid increase in temperature of the black color portions that are more likely to absorb the infrared rays tends to induce the following specific drawbacks.

In the case where a paper substrate is used for the label printing paper, there tends to occur such a problem that the substrate suffers from deformation owing to vaporization and swelling of water contained in the paper itself or water contained in an adhesive and a release paper used therein. Even though the paper substrate contains no adhesive, there tends to be still present such a problem that the substrate suffers from deformation owing to vaporization and swelling of water contained in the paper itself. On the other hand, in the case where a film substrate is used for the label printing paper, there tends to occur such a problem that the substrate suffers from heat shrinkage and therefore suffers from deformation when the temperature of the black color portions exceeds a softening point (glass transition point) of the film.

Accordingly, even when merely the infrared drying system is applied to the label printer described in Patent Literature 1 in order to increase the drying velocity of the printed characters or images obtained using the label printer, it tends to be insufficient to suppress both color migration and deformation of the label printing paper, so that it is not possible to obtain a good printed material that can be satisfactorily used in the practical applications.

In the ink-jet printing methods described in Patent Literatures 2 and 3, the composite black inks are used merely for the purpose of controlling a color tone of the printed characters or images, and therefore no studies concerning drying of the printed characters or images and suppression of deformation of the paper have been made therein.

The present invention relates to an ink-jet printing method capable of obtaining a good printed material that is free of color migration and deformation of a printing substrate even when printing characters or images on a label printing substrate.

Meanwhile, the term "printing" as used herein means a concept that includes printing or typing for printing characters or images, and the term "printed material" as used herein means a concept that includes printed matters or typed materials on which characters or images are printed.

The present inventors have found that even in a printing method using a label printing substrate, when printing characters or images with a specific composite black ink and drying the printed characters or images using an infrared heater under specific conditions, it is possible to obtain a good printed material that is free of color migration and deformation of the printing substrate.

That is, the present invention relates to an ink-jet printing method using an apparatus including a printing means for ejecting a black ink to a printing substrate to print characters or images on the printing substrate, and a drying means disposed on a downstream side of a transportation direction of the printing substrate, in which the printing substrate is a label printing substrate; the black ink is a water-based composite black ink; the water-based composite black ink contains a composite black pigment containing carbon black, and a content of the carbon black in the composite black pigment is not more than 25% by mass; and the drying means is an infrared heater for heating the water-based composite black ink ejected onto the printing substrate to a temperature of not lower than 95° C. and not higher than 125° C.

In accordance with the present invention, it is possible to provide an ink-jet printing method capable of obtaining a good printed material that is free of color migration and deformation of a printing substrate even when printing characters or images on a label printing substrate.

[Ink-Jet Printing Method]

The ink-jet printing method of the present invention is such an ink-jet printing method using an apparatus including a printing means for ejecting a black ink to a printing substrate to print characters or images on the printing substrate, and a drying means disposed on a downstream side of a transportation direction of the printing substrate, in which the printing substrate is a label printing substrate (hereinafter also referred to merely as a "printing substrate"); the black ink is a water-based composite black ink; the water-based composite black ink contains a composite black pigment containing carbon black, and a content of the carbon black in the composite black pigment is not more than 25% by mass; and the drying means is an infrared heater for heating the water-based composite black ink ejected onto the printing substrate to a temperature of not lower than 95° C. and not higher than 125° C.

According to the ink-jet printing method of the present invention, it is considered that by using the composite black ink, the difference in infrared absorption between colors of the ink is extremely small even when drying the printed characters or images using an infrared heater, and there is therefore present no difference in heating temperature between the respective portions on the printed surface, so that the printed characters or images can be quickly dried without suffering from color migration and thermal deformation of the printing substrate.

<Label Printing Substrate>

The label printing substrate used in the present invention is typically in the form of a substrate including a support and a surface layer having printability which is formed on the support. However, the label printing substrate may also be in the form of a substrate constituted of a support only on a surface of which characters or images are directly printed. Specific examples of the label printing substrate include a substrate having a two layer structure constituted of a surface layer and a support (surface layer/support), a substrate having a four layer structure constituted of a surface layer, a support, an adhesive layer and a release paper (surface layer/support/adhesive layer/release paper), a substrate having a three layer structure constituted of a support, an adhesive layer and a release paper (support/adhesive layer/release paper), and a substrate having a single layer structure constituted of a support only.

As the support of the printing substrate, there may be mentioned a paper or a resin film. Examples of the paper include various papers containing a wood pulp such as a chemical pulp, a mechanical pulp and a waste paper pulp or a non-wood pulp such as kenaf and bagasse as a main component. Examples of the resin film include a polyester film such as a polyethylene terephthalate film, a polyethylene film, a polypropylene film, a polyvinyl chloride film and a polycarbonate film.

The printing substrate may be provided on a surface thereof with a plurality of layers such as a gloss development layer similarly to an art coated paper used for ordinary printing purposes, or the thus coated surface of the printing substrate may be further subjected to gloss development treatment such as calendar treatment and cast treatment. In addition, the surface layer of the printing substrate may include an ink-receiving layer in order impart printability thereto.

The adhesive layer may be formed by conventionally known techniques in which the substrate is coated with an acrylic resin, etc., and the release paper may also be provided by conventionally known methods. In addition, the ink-receiving layer may be formed by applying a coating solution containing an inorganic or organic filler onto the surface layer or the support of the substrate using various coaters, followed by drying the obtained coating layer.

Meanwhile, the printing substrate after being printed may be cut into a desired size, if required, and then adhered as a label to commercial products upon use.

<Water-Based Composite Black Ink>

In the present invention, from the viewpoint of preventing color migration and occurrence of thermal deformation of a printing substrate and improving water resistance and weathering resistance of the resulting printed material, a water-based composite black ink (hereinafter also referred to merely as an "ink") is used.

The water-based composite black ink is preferably in the form of a water-based ink that contains a composite black pigment (A), a water-insoluble polymer (B), an organic solvent (D) and water. The water-based composite black ink may also contain additives such as a surfactant, etc., if required.

Meanwhile, the term "water-based" as used in the present specification means that water has a largest content among components of a dispersing medium contained in the ink. The water-based ink according to the present invention contains no polymerization initiator.

<Composite Black Pigment (A)>

The composite black pigment preferably contains a cyan pigment, a magenta pigment and a yellow pigment. Since the cyan pigment, the magenta pigment and the yellow pigment are different in wavelength of light absorbed therein from each other, the composite black pigment obtained by mixing these pigments is capable of absorbing a wide range of light and exhibiting a black color. The composite black pigment can contain carbon black in an amount of not more than 25% by mass.

The composite black pigment containing the cyan pigment, the magenta pigment and the yellow pigment in predetermined respective amounts can exhibit blackness that is similar to that of a black ink containing the carbon black solely.

If the balance between amounts of the cyan pigment, the magenta pigment and the yellow pigment compounded in the composite black pigment is poor, the light having a specific wavelength tends to be reflected without being absorbed therein, so that a color close to the reflected light is visually observed undesirably. For this reason, the contents of the respective pigments in the water-based composite black ink are controlled as follows from the viewpoint of suppressing change in hue of the resulting ink. That is, the content of the cyan pigment in the composite black pigment is preferably not less than 2.5% by mass, more preferably not less than 5% by mass and even more preferably not less than 7.5% by mass, the content of the magenta pigment in the composite black pigment is preferably not less than 10% by mass, more preferably not less than 20% by mass and even more preferably not less than 30% by mass, and the content of the yellow pigment in the composite black pigment is preferably not less than 10% by mass, more preferably not less than 15% by mass and even more preferably not less than 20% by mass.

The mixing ratio between the cyan pigment, the magenta pigment and the yellow pigment compounded in the composite black pigment (cyan pigment:magenta pigment:yellow pigment) is preferably 0.025 to 0.5:0.2 to 0.75:0.1 to 0.6, more preferably 0.075 to 0.4:0.3 to 0.65:0.2 to 0.5, and even more preferably 0.1 to 0.35:0.35 to 0.6:0.25 to 0.45.

The water-based composite black ink preferably contains carbon black for the purpose of enhancing a degree of blackness of the ink by allowing the ink to absorb a wide range of light therein. Examples of the carbon black may include furnace blacks, thermal lamp blacks, acetylene blacks, channel blacks and the like.

The content of the carbon black in the water-based composite black ink is not more than 25% by mass, preferably not more than 20% by mass, more preferably not more than 16% by mass and even more preferably not more than 13% by mass from the viewpoint of suppressing thermal deformation of a printing substrate owing to drying by an infrared heater.

In the present invention, the total content of the composite black pigment including the carbon black in the water-based composite black ink is preferably not less than 1.5% by mass, more preferably not less than 1.8% by mass and even more preferably not less than 2% by mass, and is also preferably not more than 10% by mass, more preferably not more than 8% by mass and even more preferably not more than 6% by mass, from the viewpoint of suppressing change in hue of the resulting ink as well as from the viewpoint of enhancing optical density of the printed characters or images.

The composite black pigment (A) is preferably in the form of a mixed pigment prepared by dispersing the cyan pigment, the magenta pigment and the yellow pigment together with the carbon black that may be optionally added if required (these pigments are hereinafter also collectively referred to merely "pigments") with a polymer, more preferably in the form of particles formed by coating at least a part of a surface of the respective pigments constituting the composite black pigment (A) with the water-insoluble polymer (B), and even more preferably in the form of a mixture of water-insoluble polymer particles containing the respective pigments (hereinafter also referred to merely as "pigment-containing polymer particles").

The pigment-containing polymer particles may have any configuration as long as the particles are formed of at least the respective pigments and the water-insoluble polymer. Examples of the configuration of the pigment-containing polymer particles include the particle configuration in which the respective pigments are enclosed or encapsulated in the water-insoluble polymer, the particle configuration in which the respective pigments are uniformly dispersed in the water-insoluble polymer, and the particle configuration in which the respective pigments are exposed onto a surface of the respective water-insoluble polymer particles, as well as a mixed configuration of these particle configurations.

In addition, the water-based composite black ink may also contain, in addition to the pigment-containing polymer particles, the below-mentioned "pigment-free water-insoluble polymer particles (C)".

Specific examples of the cyan pigment, the magenta pigment and the yellow pigment used in the present invention are as follows.

Specific examples of the cyan pigment include C.I. Pigment Blue 15, C.I. Pigment Blue 15:2, C.I. Pigment Blue 15:3, C.I. Pigment Blue 15:4, C.I. Pigment Blue 16, C.I. Pigment Blue 60, C.I. Pigment Green 7, siloxane-cross-linked aluminum phthalocyanine described in U.S. Pat. No. 4,311,775 and the like.

Of these cyan pigments, from the viewpoint of preventing color migration and thermal deformation of the printing substrate as well as from the viewpoint of improving weathering resistance of the resulting printed characters or images, preferred is at least one pigment selected from the group consisting of C.I. Pigment Blue 15:3, C.I. Pigment Blue 15:4 and C.I. Pigment Blue 16, and more preferred is at least one pigment selected from the group consisting of C.I. Pigment Blue 15:3 and C.I. Pigment Blue 15:4.

Specific examples of the magenta pigment include C.I. Pigment Red 2, C.I. Pigment Red 3, C.I. Pigment Red 5, C.I. Pigment Red 6, C.I. Pigment Red 7, C.I. Pigment Red 15, C.I. Pigment Red 16, C.I. Pigment Red 48:1, C.I. Pigment Red 53:1, C.I. Pigment Red 57:1, C.I. Pigment Red 122, C.I. Pigment Red 123, C.I. Pigment Red 139, C.I. Pigment Red 144, C.I. Pigment Red 149, C.I. Pigment Red 166, C.I. Pigment Red 177, C.I. Pigment Red 178, C.I. Pigment Red 222, C.I. Pigment Violet 19 and the like.

Of these magenta pigments, from the viewpoint of preventing color migration and thermal deformation of the printing substrate as well as from the viewpoint of improving weathering resistance of the resulting printed characters or images, preferred is at least one pigment selected from the group consisting of C.I. Pigment Red 122, C.I. Pigment Red 202, C.I. Pigment Red 209 and C.I. Pigment Violet 19, and more preferred is at least one pigment selected from the group consisting of C.I. Pigment Red 122 and C.I. Pigment Violet 19.

Specific examples of the yellow pigment include C.I. Pigment Orange 31, C.I. Pigment Orange 43, C.I. Pigment Yellow 12, C.I. Pigment Yellow 13, C.I. Pigment Yellow 14, C.I. Pigment Yellow 15, C.I. Pigment Yellow 17, C.I. Pigment Yellow 74, C.I. Pigment Yellow 93, C.I. Pigment Yellow 94, C.I. Pigment Yellow 109, C.I. Pigment Yellow 110, C.I. Pigment Yellow 128, C.I. Pigment Yellow 138, C.I.

Pigment Yellow 150, C.I. Pigment Yellow 151, C.I. Pigment Yellow 154, C.I. Pigment Yellow 155, C.I. Pigment Yellow 180, C.I. Pigment Yellow 185 and the like.

Of these yellow pigments, from the viewpoint of preventing color migration and thermal deformation of the printing substrate as well as from the viewpoint of improving weathering resistance of the resulting printed characters or images, preferred is at least one pigment selected from the group consisting of C.I. Pigment Yellow 74, C.I. Pigment Yellow 109, C.I. Pigment Yellow 110, C.I. Pigment Yellow 128, C.I. Pigment Yellow 138, C.I. Pigment Yellow 150, C.I. Pigment Yellow 154, C.I. Pigment Yellow 155 and C.I. Pigment Yellow 185, and more preferred is at least one pigment selected from the group consisting of C.I. Pigment Yellow 74, C.I. Pigment Yellow 155 and C.I. Pigment Yellow 185.

The aforementioned pigments may be respectively used alone or in combination of any two or more thereof.

<Water-Insoluble Polymer (B)>

The water-insoluble polymer has not only a function as a dispersant for dispersing the pigment in an aqueous medium and maintaining a stable dispersed state of the pigment, but also a function as a fixing agent for fixing the resulting ink on the printing substrate.

The "water-insoluble polymer" as used herein means a polymer that is undissolved and precipitated in water or a polymer whose particle size can be observed and detected, when it is attempted to dissolve the polymer that has been dried to a constant weight at 105° C. for 2 hours in water. The particle size of the water-insoluble polymer which is observed and detected above is preferably not less than 20 nm and more preferably not less than 50 nm. In the case where the water-insoluble polymer is in the form of an anionic polymer, the judgment about whether or not the polymer is water-insoluble may be made under such a condition that anionic groups of the polymer are neutralized completely (i.e., 100%) with sodium hydroxide.

Examples of the polymer used in the present invention include polyesters, polyurethanes and vinyl-based polymers. Among these polymers, from the viewpoint of improving storage stability of the resulting ink, preferred are vinyl-based polymers obtained by addition-polymerizing a vinyl monomer (such as a vinyl compound, a vinylidene compound and a vinylene compound).

The water-insoluble polymer is preferably in the form of a vinyl-based polymer that contains one or more constitutional units selected from the group consisting of a constitutional unit derived from an ionic monomer (a), a constitutional unit derived from an aromatic ring-containing hydrophobic monomer (b) and a constitutional unit derived from a hydrophilic nonionic monomer (c), more preferably two or more constitutional units selected from the group consisting of the aforementioned three constitutional units, and even more preferably all of the aforementioned three constitutional units.

The water-insoluble polymer may be obtained, for example, by subjecting the ionic monomer (a), the aromatic ring-containing hydrophobic monomer (b) and the hydrophilic nonionic monomer (c) to addition polymerization by conventionally known methods.

[Ionic Monomer (a)]

The ionic monomer (a) is used as a monomer component of the water-insoluble polymer from the viewpoint of improving storage stability of the finally obtained water-based composite black ink upon production of the below-mentioned "water dispersion of pigment-containing polymer particles" (hereinafter also referred to merely as a "pigment water dispersion").

Examples of the ionic monomer (a) include an anionic monomer and a cationic monomer. Meanwhile, the ionic monomer may also include those monomers that have no ionicity under neutral conditions, but are converted into ions under acid or alkaline conditions, such as acids and amine compounds.

Examples of the anionic monomer include at least one monomer selected from the group consisting of a carboxylic acid monomer, a sulfonic acid monomer and a phosphoric acid monomer.

Specific examples of the carboxylic acid monomer include acrylic acid, methacrylic acid, crotonic acid, itaconic acid, maleic acid, fumaric acid, citraconic acid and 2-methacryloyloxymethylsuccinic acid.

Specific examples of the sulfonic acid monomer include styrenesulfonic acid, 2-acrylamido-2-methylpropanesulfonic acid and 3-sulfopropyl (meth)acrylate.

Specific examples of the phosphoric acid monomer include vinylphosphonic acid, vinyl phosphate, bis(methacryloxyethyl)phosphate, diphenyl-2-acryloyloxyethyl phosphate and diphenyl-2-methacryloyloxyethyl phosphate.

Meanwhile, the term "(meth)acrylate" as used herein means at least one compound selected from the group consisting of a methacrylate and an acrylate, and the "(meth)acrylate" as described hereinafter is also defined in the same way.

On the other hand, examples of the cationic monomer include N,N-dimethylaminoethyl (meth)acrylate, N,N-dimethylaminopropyl (meth)acrylamide, an unsaturated tertiary amine-containing vinyl monomer such as vinyl pyrrolidone, an unsaturated ammonium salt-containing vinyl monomer, etc.

Among the aforementioned ionic monomers (a), from the viewpoint of improving storage stability of the resulting ink, preferred is an anionic monomer, more preferred is a carboxylic acid monomer, even more preferred are acrylic acid and methacrylic acid, and further even more preferred is methacrylic acid.

[Aromatic Ring-Containing Hydrophobic Monomer (b)]

The aromatic ring-containing hydrophobic monomer (b) is used from the viewpoint of improving storage stability and ejection properties of the resulting ink.

Examples of the aromatic ring-containing hydrophobic monomer (b) include at least one monomer selected from the group consisting of a styrene-based monomer, an aromatic group-containing (meth)acrylate and a styrene-based macromonomer.

As the styrene-based monomer, from the same viewpoint as described above, preferred are styrene and 2-methyl styrene, and more preferred is styrene.

As the aromatic group-containing (meth)acrylate, from the same viewpoint as described above, preferred are benzyl (meth)acrylate and phenoxyethyl (meth)acrylate, and more preferred is benzyl (meth)acrylate.

The styrene-based macromonomer is in the form of a compound containing a polymerizable functional group at one terminal end thereof and having a number-average molecular weight of not less than 500 and not more than 100,000. From the same viewpoint as described above, the number-average molecular weight of the styrene-based macromonomer is preferably not less than 1,000, more preferably not less than 2,000 and even more preferably not less than 3,000, and is also preferably not more than 10,000, more preferably not more than 9,000 and even more preferably not more than 8,000. Meanwhile, the number-average molecular weight of the styrene-based macromonomer may be measured by gel permeation chromatography using chloroform containing 1 mmol/L of dodecyl dimethylamine as a solvent and using polystyrenes as a reference standard substance.

Specific examples of commercially available products of the styrene-based macromonomer include "AS-6(S)", "AN-6(S)" and "HS-6(S)" (tradenames) all available from Toagosei Co., Ltd., etc.

As the aromatic ring-containing hydrophobic monomer (b), from the same viewpoint as described above, preferred is a combination of at least two monomers selected from the group consisting of a styrene-based monomer, an aromatic group-containing (meth)acrylate and a styrene-based macromonomer, and more preferred is a combination of styrene or benzyl (meth)acrylate, and a styrene-based macromonomer.

[Hydrophilic Nonionic Monomer (c)]

The hydrophilic nonionic monomer (c) is used from the viewpoint of improving storage stability of the resulting ink as well as from the viewpoint of suppressing increase in viscosity of the ink upon drying the ink to thereby improve ejection properties of the ink.

The hydrophilic nonionic monomer (c) is preferably a compound represented by the following formula (1).

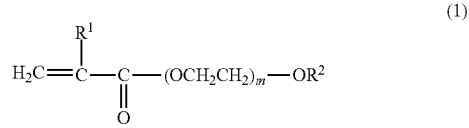

(1)

In the aforementioned formula (1), $R^1$ is a hydrogen atom or a methyl group, and preferably a methyl group; and $R^2$ is a hydrogen atom, an alkyl group having 1 to 20 carbon atoms, or a phenyl group whose hydrogen atoms may be each substituted with an alkyl group having 1 to 9 carbon atoms, preferably a hydrogen atom or an alkyl group having 1 to 10 carbon atoms, more preferably an alkyl group having 1 to 3 carbon atoms, and even more preferably a methyl group.

Also, in the aforementioned formula (1), m represents an average molar number of addition of the ($OCH_2CH_2$) groups, and is not less than 2, preferably not less than 3 and more preferably not less than 4, and is also not more than 100, preferably not more than 50, more preferably not more than 20 and even more preferably not more than 10.

Examples of the monomer (c) represented by the aforementioned formula (1) include at least one monomer selected from the group consisting of polyethylene glycol mono(meth) acrylate, methoxy polyethylene glycol mono (meth)acrylate, octoxy polyethylene glycol mono(meth) acrylate, and stearoxy polyethylene glycol mono(meth)acrylate, etc. Among these monomers (c), preferred is methoxy polyethylene glycol mono(meth)acrylate.

Specific examples of commercially available products of the monomer (c) represented by the aforementioned formula (1) include "NK ESTER M-20G", "NK ESTER M-23G", "NK ESTER M-40G", "NK ESTER M-60G", "NK ESTER M-90G", "NK ESTER M-230G", "NK ESTER M-450G" and "NK ESTER M-900G" all available from Shin-Nakamura Chemical Co., Ltd., "BLEMMER PME-200" available from NOF Corporation, and the like.

The aforementioned components (a) to (c) may be respectively used alone or in the form of a mixture of any two or more thereof.

The water-insoluble polymer may also contain constitutional units derived from the other monomers in addition to the constitutional units derived from the aforementioned monomers (a) to (c) unless the objects and advantageous effects of the present invention are adversely affected by inclusion thereof.

Examples of the other monomers include an alkyl (meth) acrylate containing an alkyl group having 1 to 22 carbon atoms, such as methyl (meth)acrylate and 2-ethylhexyl (meth)acrylate, a hydroxyalkyl (meth)acrylate such as 2-hydroxyethyl (meth)acrylate and 3-hydroxypropyl (meth)acrylate, and a silicone-based macromonomer.

The contents of the aforementioned monomers (a) to (c) in a monomer mixture containing the monomers (a) to (c) (hereinafter also referred to merely as a "monomer mixture") as used upon production of the water-insoluble polymer (contents of non-neutralized components; hereinafter defined in the same way), or the contents of the constitutional units derived from the aforementioned monomers (a) to (c) in the water-insoluble polymer are as follows from the viewpoint of improving storage stability and ejection properties of the resulting ink.

In the case where the ionic monomer (a) is included, the content of the ionic monomer (a) is preferably not less than 3% by mass, more preferably not less than 5% by mass and even more preferably not less than 8% by mass, and is also preferably not more than 40% by mass, more preferably not more than 30% by mass and even more preferably not more than 25% by mass.

In the case where the aromatic ring-containing hydrophobic monomer (b) is included, the content of the aromatic ring-containing hydrophobic monomer (b) is preferably not less than 15% by mass, more preferably not less than 30% by mass and even more preferably not less than 40% by mass, and is also preferably not more than 84% by mass, more preferably not more than 80% by mass and even more preferably not more than 72% by mass.

In addition, in the case where the styrene-based macromonomer is included as the monomer (b), it is preferred that the styrene-based macromonomer is used in combination of the other monomer than the monomer (b), such as the styrene-based monomer and/or the aromatic group-containing (meth)acrylate. The content of the styrene-based macromonomer is preferably not less than 5% by mass, more preferably not less than 15% by mass and even more preferably not less than 20% by mass, and is also preferably not more than 40% by mass, more preferably not more than 35% by mass and even more preferably not more than 30% by mass.

In the case where the hydrophilic nonionic monomer (c) is included, the content of the hydrophilic nonionic monomer (c) is preferably not less than 13% by mass, more preferably not less than 15% by mass and even more preferably not less than 18% by mass, and is also preferably not more than 45% by mass, more preferably not more than 40% by mass and even more preferably not more than 35% by mass.

In addition, in the case where the monomers (a) to (c) are included, the mass ratio of the component (a) to a sum of the component (b) and the component (c) [component (a)/(component (b)+component (c))] is preferably not less than 0.03, more preferably not less than 0.05 and even more preferably not less than 0.1, and is also preferably not more than 0.5, more preferably not more than 0.4 and even more preferably not more than 0.3, from the viewpoint of improving storage stability of the resulting ink.

(Production of Water-Insoluble Polymer)

The water-insoluble polymer may be produced by copolymerizing the aforementioned monomer mixture by conventionally known polymerization methods. As the polymerization method, there is preferably used a solution polymerization method.

The organic solvent (a) used in the solution polymerization method is not particularly limited. As the organic solvent (a), from the viewpoint of enhancing productivity of the below-mentioned pigment water dispersion, preferred is at least one compound selected from the group consisting of ketones having not less than 4 and not more than 8 carbon atoms, alcohols, ethers and esters, more preferred is a ketone having not less than 4 and not more than 8 carbon atoms, and even more preferred is methyl ethyl ketone.

The polymerization may be carried out in the presence of a polymerization initiator or a chain transfer agent. As the polymerization initiator, preferred is an azo compound, and more preferred is 2,2'-azobis(2,4-dimethylvaleronitrile), etc. As the chain transfer agent, preferred are mercaptans, and more preferred are 2-mercaptoethanol and the like.

The preferred polymerization conditions may vary depending upon the kinds of polymerization initiators used, etc. However, the polymerization temperature is preferably from 50 to 90° C., and the polymerization time is preferably from 1 to 20 hours. In addition, the polymerization is preferably conducted in a nitrogen gas atmosphere or in an atmosphere of an inert gas such as argon.

After completion of the polymerization reaction, the polymer produced may be isolated from the obtained reaction solution by known methods such as reprecipitation and removal of the solvent by distillation. In addition, the resulting polymer may be subjected to reprecipitation, membrane separation, chromatography, extraction, etc., to remove unreacted monomers, etc., from the reaction solution.

From the viewpoint of enhancing productivity of the pigment water dispersion, the obtained water-insoluble polymer is preferably used as such in the form of a polymer solution without removing the solvent used in the aforementioned polymerization reaction therefrom in order to use the organic solvent (a) contained therein as the below-mentioned organic solvent (b).

The solid content of the water-insoluble polymer solution is preferably not less than 25% by mass and more preferably not less than 30% by mass, and is also preferably not more than 60% by mass, more preferably not more than 50% by mass and even more preferably not more than 45% by mass, from the viewpoint of enhancing productivity of the pigment water dispersion.

The weight-average molecular weight of the water-insoluble polymer used in the present invention is preferably not less than 10,000, more preferably not less than 20,000 and even more preferably not more than 30,000, and is also preferably not more than 150,000 and more preferably not more than 100,000, from the viewpoint of improving storage stability and ejection properties of the resulting ink. Meanwhile, the weight-average molecular weight of the water-insoluble polymer may be measured by the method described in Examples.

[Production of Pigment-Containing Polymer Particles]

The pigment-containing polymer particles are preferably produced in the form of a water dispersion of the pigment-containing polymer particles (pigment water dispersion) from the viewpoint of enhancing productivity of the ink.

The pigment water dispersion may be produced in the form of respective pigment water dispersions containing a cyan pigment, a magenta pigment, a yellow pigment or carbon black by the process including the following steps (1) and (2).

Step (1); subjecting a mixture containing the water-insoluble polymer, the organic solvent (b), the pigment and water (hereinafter also referred to merely as a "pigment mixture") to dispersion treatment to obtain a dispersion treatment product; and Step (2): removing the organic solvent (b) from the dispersion treatment product obtained in the step (1) to obtain the pigment water dispersion.

(Step (1))

In the step (1), it is preferred that the water-insoluble polymer, the organic solvent (b), the pigment and water are first mixed, if required together with a neutralizing agent, a surfactant and the like, to obtain the pigment mixture. The order of addition of these components is not particularly limited, and it is preferred that the water-insoluble polymer, the organic solvent (b), the neutralizing agent, water and the pigment are successively added in this order.

(Organic Solvent (b))

The organic solvent (b) used in the step (1) is not particularly limited, and is preferably selected from aliphatic alcohols having 1 to 3 carbon atoms, ketones having 4 to 8 carbon atoms, ethers, esters and the like. Of these organic solvents, from the viewpoints of improving wettability to the pigment, solubility of the water-insoluble polymer and adsorption of the water-insoluble polymer onto the pigment, more preferred are ketones having 4 to 8 carbon atoms, even more preferred are methyl ethyl ketone and methyl isobutyl ketone, and further even more preferred is methyl ethyl ketone.

When the water-insoluble polymer is synthesized by a solution polymerization method, the solvent used in the solution polymerization method may be directly used as such.

The mass ratio of the water-insoluble polymer to the organic solvent [water-insoluble polymer/organic solvent] is preferably not less than 0.1, more preferably not less than 0.15 and even more preferably not less than 0.2, and is also preferably not more than 0.7, more preferably not more than 0.6 and even more preferably not more than 0.5, from the viewpoints of improving wettability to the pigment and adsorption of the water-insoluble polymer onto the pigment.

(Neutralizing Agent)

A neutralizing agent is used from the viewpoint of improving storage stability of the resulting ink. When using the neutralizing agent, the water-insoluble polymer is preferably neutralized therewith such that the pH value of the pigment water dispersion is controlled to preferably not less than 7 and more preferably not less than 7.5, and is also controlled to preferably not more than 11 and more preferably not more than 9.5.

Examples of the neutralizing agent include hydroxides of alkali metals, ammonia and organic amines.

Specific examples of the hydroxides of alkali metals include lithium hydroxide, sodium hydroxide, potassium hydroxide and cesium hydroxide. Among these hydroxides of alkali metals, preferred is sodium hydroxide.

As the neutralizing agent, preferred are the hydroxides of alkali metals and ammonia, and more preferred is a combination of the hydroxides of alkali metals with ammonia. In addition, the water-insoluble polymer may be previously neutralized.

The neutralization degree of the water-insoluble polymer is preferably not less than 30 mol %, more preferably not less than 40 mol % and even more preferably not less than 50 mol %, and is also preferably not more than 300 mol %, more preferably not more than 200 mol % and even more preferably not more than 150 mol %, from the viewpoint of improving storage stability and ejection properties of the resulting ink as well as from the viewpoint of suppressing formation of coarse particles in the ink.

The neutralization degree as described herein means the value obtained by dividing a mole equivalent of the neutralizing agent by a molar amount of the anionic groups in the water-insoluble polymer.

(Contents of Respective Components in Pigment Mixture, etc.)

The contents of the respective components in the pigment mixture are as follows from the viewpoint of improving storage stability and ejection properties of the resulting ink as well as from the viewpoint of enhancing productivity of the pigment water dispersion.

The content of the pigment in the pigment mixture is preferably not less than 10% by mass, more preferably not less than 12% by mass and even more preferably not less than 14% by mass, and is also preferably not more than 30% by mass, more preferably not more than 25% by mass and even more preferably not more than 20% by mass.

The content of the water-insoluble polymer in the pigment mixture is preferably not less than 2.0% by mass, more preferably not less than 4.0% by mass and even more preferably not less than 5.0% by mass, and is also preferably not more than 15% by mass, more preferably not more than 10% by mass and even more preferably not more than 8.0% by mass.

The content of the organic solvent in the pigment mixture is preferably not less than 10% by mass, more preferably not less than 12% by mass and even more preferably not less than 15% by mass, and is also preferably not more than 35% by mass, more preferably not more than 30% by mass and even more preferably not more than 25% by mass.

The content of water in the pigment mixture is preferably not less than 40% by mass, more preferably not less than 45% by mass and even more preferably not less than 50% by mass, and is also preferably not more than 75% by mass, more preferably not more than 70% by mass and even more preferably not more than 65% by mass.

The mass ratio of the pigment to the water-insoluble polymer [pigment/water-insoluble polymer] is preferably not less than 0.4, more preferably not less than 1 and even more preferably not less than 1.5, and is also preferably not more than 9, more preferably not more than 6 and even more preferably not more than 4, from the viewpoint of reducing viscosity of the ink upon evaporating the solvent therefrom as well as from the viewpoint of improving storage stability and ejection properties of the resulting ink.

(Dispersion Treatment of Pigment Mixture)

The method of dispersing the pigment mixture to obtain the dispersion treatment product as used in the step (1) is not particularly limited. The pigment particles may be atomized into fine particles having a desired average particle size only by substantial dispersion treatment. However, it is preferred that the pigment mixture is first subjected to preliminary dispersion treatment, and then further subjected to the substantial dispersion treatment by applying a shear stress thereto so as to control the average particle size of the obtained pigment particles to a desired value.

The temperature used in the preliminary dispersion treatment is preferably not lower than 0° C., and is also preferably not higher than 40° C., more preferably not higher than 30° C. and even more preferably not higher than 20° C. The dispersing time is preferably not less than 0.5 hour and more preferably not less than 1 hour, and is also preferably not more than 30 hours, more preferably not more than 10 hours and even more preferably not more than 5 hours.

When subjecting the pigment mixture to the preliminary dispersion treatment, there may be used mixing and stirring devices such as anchor blades and disper blades. Of these mixing and stirring devices, preferred are high-speed stirring mixers.

The temperature used in the substantial dispersion treatment is preferably not lower than 0° C., and is also preferably not higher than 40° C., more preferably not higher than 30° C. and even more preferably not higher than 20° C.

As the means for applying a shear stress to the pigment mixture in the substantial dispersion treatment, there may be used kneading machines such as roll mills and kneaders, high-pressure homogenizers such as a "Microfluidizer" available from Microfluidics Corporation, and media-type dispersers such as paint shakers and beads mills. These devices may be used in combination of any two or more thereof. Among these devices, the high-pressure homogenizers are preferably used from the viewpoint of reducing the particle size of the pigment.

When conducting the substantial dispersion treatment using the high-pressure homogenizers, it is possible to adjust the particle size of the pigment to a desired value by controlling the treating pressure and the number of passes. The treating pressure used in the substantial dispersion treatment is preferably not less than 60 MPa, more preferably not less than 100 MPa and even more preferably not less than 130 MPa, and is also preferably not more than 200 MPa, more preferably not more than 180 MPa and even more preferably not more than 170 MPa, from the viewpoint of enhancing productivity and cost efficiency. Also, the number of passes through the homogenizer used in the substantial dispersion treatment is preferably not less than 3, more preferably not less than 5 and even more preferably not less than 7, and is also preferably more than 30, more preferably not more than 25 and even more preferably not more than 15.

(Step (2))

The step (2) is such a step in which the aforementioned organic solvent (b) is removed from the dispersion treatment product obtained in the step (1) to thereby obtain the pigment water dispersion. The removal of the organic solvent may be conducted by conventionally known methods.

In order to suppress formation of any flocculated product in the course of removing the organic solvent, it is preferred that water is previously added to the dispersion treatment product before removing the organic solvent therefrom to well control a mass ratio of the organic solvent (b) to water (organic solvent (b)/water) in the dispersion treatment product.

The mass ratio of the organic solvent (b) to water (organic solvent (b)/water) in the dispersion treatment product is preferably not less than 0.08 and more preferably not less than 0.1, and is also preferably not more than 0.4 and more preferably not more than 0.2.

In addition, the concentration of non-volatile components in the pigment water dispersion (solid content of the pigment water dispersion) after controlling the mass ratio of the organic solvent (b) to water (organic solvent (b)/water) therein is preferably not less than 5% by mass, more preferably not less than 8% by mass and even more preferably not less than 10% by mass, and is also preferably not more than 30% by mass, more preferably not more than 25% by mass and even more preferably not more than 20% by mass.

As the apparatus for removing the organic solvent (b) in the step (2), from the viewpoint of improving removal efficiency of the organic solvent (b), there is preferably used a rotary reduced-pressure distillation device such as a rotary evaporator, a stirring tank thin film evaporator, etc.

The temperature of the dispersion treatment product upon removing the organic solvent (b) therefrom may be appropriately determined according to the kind of organic solvent (b) to be removed. The temperature of the dispersion treatment product upon removing the organic solvent (b) therefrom under reduced pressure is preferably not lower than 20° C., more preferably not lower than 25° C. and even more preferably not lower than 30° C., and is also preferably not higher than 80° C., more preferably not higher than 70° C. and even more preferably not higher than 65° C. The pressure used upon removal of the organic solvent (b) is preferably not less than 0.01 MPa, more preferably not less than 0.02 MPa and even more preferably not less than 0.05 MPa, and is also preferably not more than 0.5 MPa, more preferably not more than 0.2 MPa and even more preferably not more than 0.1 MPa.

The time required for removal of the organic solvent (b) is preferably not less than 1 hour and more preferably not less than 2 hours, and is also preferably not more than 24 hours and more preferably not more than 12 hours.

The removal of the organic solvent (b) is preferably conducted until the solid content of the dispersion treatment product falls within the range of preferably not less than 10% by mass and more preferably not less than 20% by mass, and also preferably not more than 35% by mass and more preferably not more than 30% by mass.

The resulting concentrated solution is preferably subjected to centrifugal separation, so that it is possible to obtain the pigment water dispersion from a liquid layer portion recovered from the concentrated solution.

The organic solvent is preferably substantially completely removed from the thus obtained pigment water dispersion. However, the residual organic solvent may be present in the pigment water dispersion unless the objects and advantageous effects of the present invention are adversely affected by the residual organic solvent. The content of the residual organic solvent in the pigment water dispersion is preferably not more than 0.1% by weight and more preferably not more than 0.01% by weight.

The concentration of non-volatile components in the resulting pigment water dispersion containing the pigment-containing polymer particles (solid content of the pigment water dispersion) is preferably not less than 10% by mass and more preferably not less than 15% by mass, and is also preferably not more than 30% by mass and more preferably not more than 25% by mass, from the viewpoint of improving dispersion stability of the pigment water dispersion as well as from the viewpoint of facilitating preparation of the ink.

In the thus-obtained pigment water dispersion containing the pigment-containing polymer particles, the solid components constituted of the pigment and the water-insoluble polymer are dispersed in a dispersing medium containing water as a main medium.

The average particle size of the pigment-containing polymer particles in the pigment water dispersion is preferably not less than 40 nm, more preferably not less than 60 nm and even more preferably not less than 80 nm, and is also preferably not more than 150 nm and more preferably not more than 140 nm, from the viewpoint of improving storage stability and ejection properties of the resulting ink.

Meanwhile, the average particle size of the pigment-containing polymer particles may be measured by the method described in Examples.

In addition, the average particle size of the pigment-containing polymer particles in the ink using the pigment-containing polymer particles is the same as the average particle size of the pigment-containing polymer particles in the pigment water dispersion, and the preferred range of the average particle size of the pigment-containing polymer particles in the ink using the pigment-containing polymer particles is also the same as that of the average particle size of the pigment-containing polymer particles in the pigment water dispersion.

(Content of Pigment-Containing Polymer Particles)

In the case where the pigment-containing polymer particles are used as the pigment for the ink, the content of the pigment-containing polymer particles in the ink is preferably not less than 1.4% by mass, more preferably not less than 2.8% by mass and even more preferably not less than 4.2% by mass, and is also preferably not more than 21% by mass, more preferably not more than 14% by mass and even more preferably not more than 8.4% by mass, from the viewpoint of accelerating drying of the ink on the paper surface upon printing characters or images on a printing substrate to suppress reduction of dot sizes of the ink during the drying step and improve uniformity of the printed characters or images as well as from the viewpoint of enhancing optical density of the ink.

(Content of Water-Insoluble Polymer)

When using the pigment-containing polymer particles, the content of the water-insoluble polymer in the ink is preferably not less than 0.4% by mass, more preferably not less than 0.8% by mass and even more preferably not less than 1.2% by mass from the viewpoint of improving storage stability and ejection properties of the ink as well as from the viewpoint of improving uniformity of the printed characters or images. Also, from the viewpoint of reducing viscosity of the ink upon evaporation of the solvent therefrom, increasing dot sizes of the ink upon printing characters or images on a printing substrate and enhancing optical density of the ink as well as from the viewpoint of improving storage stability and ejection properties of the ink, the content of the water-insoluble polymer in the ink is preferably not more than 6% by mass, more preferably not more than 4% by mass and even more preferably not more than 2.4% by mass.

<Pigment-Free Water-Insoluble Polymer Particles (C)>

The water-based composite black ink also preferably contains pigment-free water-insoluble polymer particles from the viewpoint of improving fixing properties of the characters or images printed on a printing substrate.

The water-insoluble polymer particles preferably contain a constitutional unit derived from a (meth)acrylic acid (c1) and a constitutional unit derived from a (meth)acrylic acid ester (c2).

Examples of a monomer as the component (c1) include acrylic acid and methacrylic acid. Of these monomers as the component (c1), preferred is methacrylic acid. Examples of a monomer as the component (c2) include a (meth)acrylic acid ester containing an alkyl group having 1 to 22 carbon atoms, preferably 1 to 10 carbon atoms and more preferably 1 to 8 carbon atoms, and an aromatic group-containing (meth)acrylic acid ester such as benzyl (meth)acrylate and phenoxyethyl (meth)acrylate. Of these monomers as the component (c2), preferred are methyl methacrylate and 2-ethylhexyl acrylate.

The content of the constitutional unit derived from the component (c1) in the whole constitutional units of the water-insoluble polymer particles is preferably not less than 1% by mass, more preferably not less than 1.5% by mass and even more preferably not less than 2% by mass, and is also preferably not more than 6% by mass, more preferably not more than 5.8% by mass and even more preferably not more than 5.5% by mass, from the viewpoint of improving storage stability and fixing properties of the resulting ink. In addition, the content of the constitutional unit derived from the component (c2) in the whole constitutional units of the water-insoluble polymer particles is preferably not less than 94% by mass and more preferably not less than 94.5% by mass, and is also preferably not more than 99% by mass and more preferably not more than 98% by mass.

The water-insoluble polymer particles used in the present invention may be either a synthesized product or a commercially available product.

In the case where the water-insoluble polymer particles are synthesized, a mixture of the components (c1) and (c2) may be subjected to copolymerization reaction by conventionally known emulsion polymerization methods. From the viewpoint of well compounding the water-insoluble polymer particles in the ink, the obtained polymer particles (C) are preferably used as such in the form of a polymer dispersion containing water as a dispersing medium without removing the solvent used in the aforementioned polymerization reaction therefrom.

The solid content of the dispersion of the water-insoluble polymer particles is preferably not less than 30% by mass and more preferably not less than 40% by mass, and is also preferably not more than 60% by mass and more preferably not more than 50% by mass, from the viewpoint of well compounding the water-insoluble polymer particles together with the pigment-containing polymer particles in the ink.

The weight-average molecular weight of the water-insoluble polymer particles is preferably not less than 100,000, more preferably not less than 200,000 and even more preferably not less than 500,000 from the viewpoint of improving fixing properties of the resulting ink.

The average particle size of the water-insoluble polymer particles is preferably not less than 10 nm, more preferably not less than 30 nm and even more preferably not less than 50 nm, and is also preferably not more than 300 nm, more preferably not more than 200 nm and even more preferably not more than 150 nm, from the viewpoint of improving storage stability of the resulting ink.

Meanwhile, the weight-average molecular weight and the average particle size of the water-insoluble polymer particles may be measured by the methods described in Examples.

Examples of commercially available products of the dispersion of the water-insoluble polymer particles include dispersions of acrylic resins such as "Neocryl A1127" (anionic self-crosslinkable aqueous acrylic resin) available from DSM NeoResins, Inc., and "JONCRYL 390" available from BASF Japan, Ltd.; styrene-acrylic resins such as "JONCRYL 7100", "JONCRYL 734" and "JONCRYL 538" all available from BASF Japan, Ltd.; and vinyl chloride-based resins such as "VINYBLAN 701" available from Nissin Chemical Co., Ltd.

The content of the water-insoluble polymer particles in the dispersion containing the water-insoluble polymer particles is preferably not less than 10% by mass, more preferably not less than 20% by mass and even more preferably not less than 30% by mass, and is also preferably not more than 70% by mass, more preferably not more than 60% by mass and even more preferably not more than 55% by mass, from the viewpoint of improving dispersion stability of the water-insoluble polymer particles in the dispersion and improving convenience upon compounding the water-insoluble polymer particles in the ink.

When using the water-insoluble polymer particles, the content of the water-insoluble polymer particles in the ink is preferably not less than 1% by mass, more preferably not less than 1.2% by mass and even more preferably not less than 1.5% by mass, and is also preferably not more than 4% by mass, more preferably not more than 3.5% by mass and even more preferably not more than 3% by mass, from the viewpoint of improving fixing properties of the ink as well as from the viewpoint of improving uniformity of the printed characters or images.

<Organic Solvent (D)>

The organic solvent is used from the viewpoint of improving storage stability of the water-based composite black ink as well as from the viewpoint of improving uniformity of the printed characters or images owing to spread of ink dots. Suitable examples of the organic solvent include polyhydric alcohols.

Specific examples of the polyhydric alcohols include ethylene glycol, diethylene glycol, polyethylene glycol, propylene glycol, dipropylene glycol, polypropylene glycol, 1,3-propanediol, 1,3-butanediol, 1,4-butanediol, 3-methyl-1,3-butanediol, 1,5-pentanediol, 1,6-hexanediol, 2-methyl-2,4-pentanediol, 1,2,6-hexanetriol, 1,2,4-butanetriol, 1,2,3-butanetriol and petriol. Among these polyhydric alcohols, preferred are ethylene glycol (boiling point (b.p.) 197° C.), propylene glycol (b.p. 188° C.) and diethylene glycol (b.p. 244° C.), and more preferred are diethylene glycol and propylene glycol.

The water-based composite black ink according to the present invention may also contain various ordinary additives that may be usually used in water-based inks, such as a surfactant, a wetting agent, a penetrant, a humectant, a viscosity controller, a pH modifier, a defoaming agent, an antiseptic agent, a mildew-proof agent, a rust preventive and an antioxidant, etc., if required.

A surfactant may be used to well control properties of the ink such as a surface tension, etc. Examples of the surfactant include a nonionic surfactant, an anionic surfactant and a cationic surfactant, etc. Among these surfactants, preferred are a nonionic surfactant and an anionic surfactant, and more preferred is a nonionic surfactant.

Among the nonionic surfactants, preferred are an ethyleneoxide adduct of an acetylene glycol, an alkyleneoxide adduct of an alcohol, a fatty acid alkanol amide, etc.

These surfactants may be used alone or in the form of a mixture of any two or more thereof.

The content of the surfactant in the ink is not particularly limited, and is from 0.01 to 5% by mass, preferably from 0.1 to 4% by mass and more preferably from 0.5 to 3% by mass.

<Production of Water-Based Composite Black Ink>

The water-based composite black ink according to the present invention can be produced by mixing a cyan pigment, a magenta pigment, a yellow pigment or carbon black that may be optionally added according to the requirements, the water-insoluble polymer (B), the organic solvent (D) and water, if required together with the water-insoluble polymer particles (C) and various additives such as a surfactant to prepare respective color inks, and further mixing the thus prepared color inks with each other.

(Content of Water)

The content of water in the ink is preferably not less than 20% by mass, more preferably not less than 30% by mass and even more preferably not less than 40% by mass, and is also preferably not more than 75% by mass, from the viewpoint of improving storage stability, optical density and ejection properties of the ink.

(Properties of Ink)

The viscosity of the ink as measured at 32° C. is preferably not less than 2 mPa·s, more preferably not less than 3 mPa·s and even more preferably not less than 5 mPa·s, and is also preferably not more than 12 mPa·s, more preferably not more than 9 mPa·s and even more preferably not more than 7 mPa·s, from the viewpoint of improving storage stability and ejection properties of the ink.

The pH value of the water-based ink is preferably not less than 7, more preferably not less than 8 and even more preferably not less than 8.5, and is also preferably not more than 11, more preferably not more than 10 and even more preferably not more than 9.5, from the viewpoint of improving storage stability and ejection properties of the ink as well as from the viewpoint of improving resistance of members to the water-based ink and suppressing skin irritation.

<Ink-Jet Printing Method>

The ink-jet printing method of the present invention is such an ink-jet printing method using an apparatus equipped with a printing means for ejecting a black ink to a printing substrate to print characters or images on the printing substrate, and a drying means disposed on a downstream side of a transportation direction of the printing substrate, in which the printing substrate is a label printing substrate; the black ink is a water-based composite black ink; the water-based composite black ink contains a composite black pigment containing carbon black, and a content of the carbon black in the composite black pigment is not more than 25% by mass; and the drying means is an infrared heater for heating the water-based composite black ink ejected onto the printing substrate to a temperature of not lower than 95° C. and preferably not lower than 105° C., and also not higher than 125° C.

<Ink-Jet Printing Apparatus>

In the following, an ink-jet printing apparatus suitably used in the ink-jet printing method of the present invention is described by referring to FIG. 1.

FIG. 1 is a schematic view showing an embodiment of an internal structure of the ink-jet printing apparatus used in the present invention in which FIG. 1(a) is a front view of the ink-jet printing apparatus, and FIG. 1(b) is a plan view of the ink-jet printing apparatus.

In FIG. 1, there is shown an ink-jet printing apparatus 1 which is mainly constructed of a paper feed section A in which a paper feed roll 10 is retained, a printing section B including a printing means 21, a drying section C in which infrared rays are irradiated to a printed material to fix and solidify an ink ejected thereon, and a paper delivery section D including a paper delivery roll 40 for taking up the printed material. A printing substrate (rolled paper) 11 is wound off from the paper feed roll 10, transported via the printing section B and the drying section C, and then wound up around the paper delivery roll 40.

The printing apparatus 1 has an elongated shape (for example, about 3 m) extending in a transportation direction of the printing substrate 11 and having a width similar to that of the printing substrate 11 (for example, about 30 cm).

The printing apparatus 1 is equipped with a plurality of line-type print heads 21a for printing characters or images on the printing substrate 11 delivered from the paper feed roll 10 while maintaining the print heads at predetermined positions relative to the printing substrate 11, and further equipped with the drying section C for irradiating infrared rays to the printing substrate 11 to fix and solidify the ink ejected thereonto for a short period of time. This construction allows the printing apparatus to conduct high-speed printing.

(Paper Feed Section A)

The printing substrate 11 wound off from the paper feed roll 10 in the generally horizontal direction is passed between a pair of pressing rollers 12, guided downwards by a first guide roller 13 and then upwards by a dancer roller 14 which is freely rotatable and movable in the vertical direction, and further guided in the direction toward a left upper side of the FIGURE by a second guide roller 15.

It is preferred that a preheater 16 is disposed between the dancer roller 14 and the second guide roller 15 to preheat the printing substrate 11.

In FIG. 1, the preheater 16 is constructed of an electric surface heater having a convex curved surface on its side contacting with the printing substrate 11, and disposed such that a rear surface side of the printing substrate 11 is brought into press contact with the preheater 16 by means of four free rollers 17.

The output of the preheater 16 may vary depending upon a material and a thickness of the printing substrate 11, a transportation speed thereof, etc., and may be controlled such that the temperature of the surface of the printing substrate 11 as measured immediately beneath the printing means 21 is preferably not lower than 35° C. and more preferably not lower than 40° C., and is also preferably not higher than 65° C. and more preferably not higher than 60° C.

By preheating the printing substrate 11 by the preheater 16, it is possible to reduce viscosity of the ink upon impacting droplets of the ink on the printing substrate 11 in the printing section B. With this construction, even when spread of dots of the ink becomes insufficient owing to change in paper quality of the printing substrate 11, variation in dot size of the ink occurring thereupon can be well controlled, so that it is possible to conduct good printing without changing the ink used.

(Printing Section B)

The printing means 21 is equipped with a plurality of the print heads 21a which are capable of ejecting a water-based composite black ink and chromatic inks, for example, such as a cyan ink, a magenta ink and a yellow ink to conduct ink-jet printing on the printing substrate 11. In FIG. 1, there is shown an embodiment of the apparatus using four color print heads, but five or more color print heads may also be used in the present invention.

The water-based composite black ink is preferably produced by mixing a cyan ink containing a cyan pigment, a magenta ink containing a magenta pigment, a yellow ink containing a yellow pigment and a black ink containing carbon black.

Beneath the printing means 21, there may be disposed a suction box 22 which serves for sucking the printing substrate 11 in the downward direction under a negative pressure to maintain a constant gap between the printing means 21 and the printed surface of the printing substrate 11.

The ejection type of the print heads 21a may be either a thermal type or a piezoelectric type, and is preferably a piezoelectric type.

The voltage applied to the respective print heads 21a is preferably not less than 5 V, more preferably not less than 10 V and even more preferably not less than 15 V, and is also preferably not more than 40 V, more preferably not more than 35 V and even more preferably not more than 30 V, from the viewpoint of improving high-speed printing efficiency, etc.

The drive frequency of the printing apparatus is preferably not less than 1 kHz, more preferably not less than 3 kHz and even more preferably not less than 5 kHz, and is also preferably not more than 80 kHz, more preferably not more than 60 kHz and even more preferably not more than 40 kHz, from the viewpoint of improving high-speed printing efficiency, etc.

The amount of droplets of the ink ejected as calculated per one droplet of the ink is preferably not less than 0.5 pL, more preferably not less than 1.0 pL and even more preferably not less than 3 pL, and is also preferably not more than 30 pL, more preferably not more than 25 pL and even more preferably not more than 20 pL, from the viewpoint of maintaining good accuracy of impact positions of droplets of the ink as well as from the viewpoint of improving quality of the printed characters or images.

The print head resolution is preferably not less than 300 dpi (dot/inch), more preferably not less than 500 dpi and even more preferably not less than 550 dpi.

The inside temperature of the printing means 21 upon printing is preferably not lower than 20° C., more preferably not lower than 25° C. and even more preferably not lower than 30° C., and is also preferably not higher than 45° C., more preferably not higher than 40° C. and even more preferably not higher than 38° C., from the viewpoint of reducing viscosity of the ink and improving continuous ejection properties of the ink.

The transportation speed of the printing substrate 11 is preferably not less than 6 m/min, more preferably not less than 15 m/min, even more preferably not less than 20 m/min, further even more preferably not less than 30 m/min and still further even more preferably not less than 40 m/min from the viewpoint of enhancing productivity of the printed material.

Subsequently, the printing substrate 11 is transported to the drying section C.

(Drying Section C)

In the drying section C, there is disposed an infrared heater 31 for irradiating infrared rays to the water-based composite black ink ejected onto the printing substrate 11. The infrared heater 31 is capable of heating the water-based composite black ink to a temperature of not lower than 95° C. and not higher than 125° C. to dry, fix and solidify the ink ejected on the printing substrate 11.

The drying temperature is preferably not lower than 98° C. and more preferably not lower than 100° C., and is also preferably not higher than 123° C. and more preferably not higher than 120° C.

The term "fixing" as used herein means a concept including both penetration of droplets of the ink impacted onto the printing substrate 11 to an inside of paper thereof and drying of the ink from the surface of the printing substrate 11, and also indicates such a condition that the ink impacted on the surface of the printing substrate 11 is no longer present in the form of droplets of the ink thereon. In addition, the term "solidifying" as used herein means such a condition that droplets of the ink impacted onto the printing substrate 11 are solidified so that the ink is fixed onto the surface of the printing substrate 11.

The infrared heater 31 is in the form of a heating element obtained by forming a composite oxide film containing Si, Fe, Zr, Ti, Mn, etc., on a surface of a quartz glass, a ceramic material, etc.

In FIG. 1, six infrared lamp heaters are provided as the infrared heater 31. The number of the infrared lamp heaters may vary depending upon an electric energy used, etc., and is preferably not less than 3, more preferably not less than 4 and even more preferably not less than 5, and is also preferably not more than 10, more preferably not more than 9 and even more preferably not more than 8.

As the infrared lamp heater, from the viewpoint of heating and drying the ink with high productivity, preferred is a mid-infrared lamp heater (wavelength: 2.5 to 8 μm), and more preferred is a mid-infrared lamp heater equipped with a mid-infrared reflector plate disposed above the heater. As the mid-infrared lamp heater, there may be used, for example, a xenon lamp heater which is constructed of a quartz glass tube, a tungsten heating wire disposed within the quartz glass tube and a halogen gas for preventing deterioration of the tungsten heating wire which is sealingly filled within the quartz glass tube.

The conditions of irradiation of the infrared rays are as follows. The rated voltage of the infrared heater upon irradiation of the infrared rays is 200V, and the output of the infrared heater upon irradiation of the infrared rays is preferably not less than 800 W, more preferably not less than 900 W and even more preferably not less than 1000 W, and is also preferably not more than 1500 W, more preferably not more than 1400 W and even more preferably not more than 1300 W.

The time of irradiation of the infrared rays is preferably not less than 0.5 second, more preferably not less than 1.0 second and even more preferably not less than 1.5 seconds from the viewpoint of sufficiently drying the ink, and is also preferably not more than 10 seconds, more preferably not more than 6 seconds and even more preferably not more than 3 seconds from the viewpoint of enhancing productivity of the printed material.

The distance between the infrared heater 31 and the printing substrate 11 is preferably not less than 30 mm, more preferably not less than 40 mm and even more preferably not less than 50 mm, and is also preferably not more than 90 mm, more preferably not more than 80 mm and even more preferably not more than 70 mm, from the viewpoint of preventing deformation of the printing substrate 11 and saving energy consumed.

The drying conditions that are capable of heating the surface of the water-based composite black ink to a temperature of not lower than 95° C. and not higher than 125° C. at an outlet of the drying section C can be achieved by a combination of a transportation speed of the printing substrate 11 of 12.5 to 50 m/min, the number of the infrared heaters of 3 to 6 and an output of the respective infrared heaters per unit time of 550 to 1,100 W.

For example, by setting the transportation speed of the printing substrate 11 to 25 m/min, the number of the infrared heaters to 6 and the output of the respective infrared heaters to 1,100 W, the temperature of the surface of the water-based composite black ink can be controlled to 118° C. In addition, by setting the transportation speed of the printing substrate 11 to 12.5 m/min, the number of the infrared heaters to 6 and the output of the respective infrared heaters to 800 W, the temperature of the surface of the water-based composite black ink can be controlled to 110° C. Furthermore, by setting the transportation speed of the printing substrate 11 to 12.5 m/min, the number of the infrared heaters to 3 and the output of the respective infrared heaters to 1,100 W, the temperature of the surface of the water-based composite black ink can be controlled to 115° C.

(Paper Delivery Section D)

The printing substrate 11 having passing through the drying section C is transported via rollers 32 to 34, and if required further via a drying buffer section in which the printing substrate is subjected to after-heating, to the paper delivery section D.

In the paper delivery section D, the printing substrate 11 is wound up over the paper delivery roll 40.

The transportation speed of the printing substrate 11 is controlled, for example, to 50 m/min in maximum, so that it is possible to provide such a construction that the printing substrate 11 having a length of more than 400 m is available upon use in the practical applications.

EXAMPLES

In the following Synthesis Examples, Production Examples and Preparation Examples, the "part(s)" and "%" indicate "part(s) by mass" and "% by mass", respectively, unless otherwise specified. Meanwhile, various properties, etc., were measured by the following methods.

(1) Measurement of Weight-Average Molecular Weight of Water-Insoluble Polymer

The weight-average molecular weight of the water-insoluble polymer was measured by gel permeation chromatography [GPC apparatus: "HLC-8120GPC" available from Tosoh Corporation; columns: "TSK-GEL, α-M"×2 available from Tosoh Corporation; flow rate: 1 mL/min] using a solution prepared by dissolving phosphoric acid and lithium bromide in N,N-dimethyl formamide such that concentrations of phosphoric acid and lithium bromide in the resulting solution were 60 mmol/L and 50 mmol/L, respectively, as an eluent, and using monodisperse polystyrenes having previously known molecular weights as a reference standard substance.

(2) Measurement of Average Particle Sizes of Pigment-Containing Polymer Particles and Water-Insoluble Polymer Particles The particles were subjected to cumulant analysis using a laser particle analyzing system "ELS-8000" available from Otsuka Electrics Co., Ltd., to measure an average particle size thereof. The measurement was conducted by diluting the dispersion to be measured with water so as to adjust a concentration of the dispersion to $5 \times 10^{-3}$% by mass in terms of a solid content thereof. Also, the measurement was conducted under the conditions including a temperature of 25° C., an angle between incident light and detector of 90° and a cumulative number of 100 times, and a refractive index of water (1.333) was input to the analyzing system as a refractive index of the dispersing medium. The thus measured cumulant average particle size of the particles was defined as an average particle size of the pigment-containing polymer particles.

(3) Measurement of Solid Content of Pigment Water Dispersion

Sodium sulfate dried to constant weight in a desiccator was weighed and charged in an amount of 10.0 g into a 30 mL polypropylene container (φ: 40 mm; height: 30 mm), and about 1.0 g of a sample to be measured was added to the container. The contents of the container were mixed and then accurately weighed. The resulting mixture was maintained in the container at 105° C. for 2 hours to remove volatile components therefrom, and further allowed to stand in a desiccator for 15 minutes to measure a mass thereof. The mass of the sample after removing the volatile components therefrom was regarded as a mass of solids therein. The solid content of the sample was calculated by dividing the mass of the solids by the mass of the sample initially added.

Synthesis Example 1

Synthesis of Water-Insoluble Polymer Solution

The monomers, solvent (methyl ethyl ketone) and chain transfer agent (2-mercaptoethanol) shown in the column "Initially Charged Monomer Solution" in Table 1 were charged into a reaction vessel equipped with two dropping funnels 1 and 2 and mixed with each other, and an inside atmosphere of the reaction vessel was replaced with nitrogen gas, thereby obtaining an initially charged monomer solution.

On the other hand, the monomers, solvent, polymerization initiator "V-65" (tradename; 2,2'-azobis(2,4-dimethylvaleronitrile)) available from Wako Pure Chemical Industries, Ltd., and chain transfer agent shown in the column "Dropping Monomer Solution 1" in Table 1 were mixed with each other to obtain a dropping monomer solution 1. The thus obtained dropping monomer solution 1 was charged into the dropping funnel 1, and an inside atmosphere of the dropping funnel 1 was replaced with nitrogen gas.

In addition, the monomers, solvent, polymerization initiator and chain transfer agent shown in the column "Dropping Monomer Solution 2" in Table 1 were mixed with each other to obtain a dropping monomer solution 2. The thus obtained dropping monomer solution 2 was charged into the dropping funnel 2, and an inside atmosphere of the dropping funnel 2 was replaced with nitrogen gas.

In a nitrogen atmosphere, the initially charged monomer solution in the reaction vessel was maintained at 77° C. while stirring, and the dropping monomer solution 1 in the dropping funnel 1 was gradually added dropwise to the reaction vessel over 3 hours. Next, the dropping monomer solution 2 in the dropping funnel 2 was gradually added dropwise to the reaction vessel over 2 hours. After completion of the dropwise addition, the mixed solution in the reaction vessel was stirred at 77° C. for 0.5 hour.

Then, a polymerization initiator solution prepared by dissolving 0.6 part of the aforementioned polymerization initiator "V-65" in 27.0 part of methyl ethyl ketone was added to the mixed solution, and the resulting reaction solution was aged at 77° C. for 1 hour while stirring. The aforementioned procedure including the preparation and addition of the polymerization initiator solution and the aging of the reaction solution was repeated five more times. Then, while maintaining the reaction solution in the reaction vessel at 80° C. for 1 hour, methyl ethyl ketone was added thereto, thereby obtaining a solution of a water-insoluble polymer (solid content: 40.8%).

The weight-average molecular weight of the thus obtained water-insoluble polymer was 52,700. In addition, the resulting water-insoluble polymer was dried to constant weight at 105° C. for 2 hours, and the dried polymer was then dissolved in water to prepare an aqueous polymer solution having a concentration of $5 \times 10^{-3}$% by mass in terms of a solid content thereof. It was confirmed that the average particle size of the polymer particles in the resulting solution was 89 nm.

Meanwhile, the details of the respective monomers shown in Table 1 were as follows.

Styrene macromer: "AS-6(S)" (active ingredient content: 50% by mass; number-average molecular weight: 6000) available from Toagosei Co., Ltd.

M-40G: Methoxy polyethylene glycol monomethacrylate "NK ESTER M-40G" (average molecular number of addition of ethyleneoxide: 4; end group: methoxy group) available from Shin-Nakamura Chemical Co., Ltd.

TABLE 1

|  | Initially charged monomer solution (part(s)) | Dropping monomer solution 1 (part(s)) | Dropping monomer solution 2 (part(s)) |
| --- | --- | --- | --- |
| (a) Ionic monomer | | | |
| Methacrylic acid | — | 51.2 | 12.8 |
| (b) Hydrophobic monomer | | | |
| Styrene | 17.6 | 140.8 | 17.6 |
| Styrene macromer | 12.0 | 108.0 | — |
| (c) Hydrophilic monomer | | | |
| NK ESTER M-40G | 10.0 | 80.0 | 10.0 |
| Solvent | | | |
| Methyl ethyl ketone | 6.0 | 66.0 | 48.0 |
| Polymerization initiator | | | |
| V-65 | — | 3.2 | 0.8 |
| Chain transfer agent | | | |
| 2-Mercaptoethanol | 0.08 | 0.56 | 0.16 |

Production Example 1

Production of Water Dispersion of Carbon Black-Containing Water-Insoluble Polymer Particles (1) The water-insoluble polymer solution (solid content: 40.8%) obtained in Synthesis Example 1 and methyl ethyl ketone (MEK) were mixed with each other in amounts of 157.6 g and 60.4 g, respectively, thereby obtaining an MEK solution of the water-insoluble polymer. The resulting MEK solution of the water-insoluble polymer was charged into a 2 L-capacity disper, and while stirring the solution at 1400 rpm, 448.3 g of ion-exchanged water, 19.5 g of a 5N sodium hydroxide aqueous solution and 1.5 g of a 25% ammonia aqueous solution were added thereto such that the degree of neutralization of the water-insoluble polymer by sodium hydroxide was adjusted to 85% and the degree of neutralization of the water-insoluble polymer by ammonia was adjusted to 40%. The resulting reaction solution was stirred at 1400 rpm for 15 minutes while cooling the solution in a water bath at 0° C. Then, 150 g of carbon black "MONARCH717" available from Cabot Corporation was added to the reaction solution, and the resulting mixture was stirred at 7000 rpm for 3 hours. The obtained pigment mixture was subjected to dispersion treatment under a pressure of 150 MPa by passing the mixture through a Microfluidizer "M-110EH-30XP" available from Microfluidics Corporation 20 times, thereby obtaining a dispersion treatment product having a solid content of 21% by mass.

(2) A 2 L eggplant-shaped flask was charged with 1000 g of the dispersion treatment product obtained in the above step, and then 400 g of ion-exchanged water was added thereto (solid content: 15% by mass). The resulting mixture was maintained under a pressure of 0.09 MPa in a warm water bath adjusted at 32° C. for 3 hours using a rotary distillation apparatus "Rotary Evaporator N-1000S" available from Tokyo Rikakikai Co., Ltd., operated at a rotating speed of 50 rpm to remove the organic solvent therefrom. Further, the temperature of the warm water bath was adjusted to 62° C., and the pressure in the apparatus was reduced to 0.07 MPa, and the reaction solution was concentrated under this condition until a solid content of the reaction solution reached 25% by mass.

(3) The thus obtained concentrated solution was charged into a 500 mL angle rotor, and subjected to centrifugal separation using a high-speed cooling centrifuge "himac CR22G" (temperature set: 20° C.) available from Hitachi Koki Co., Ltd., at 7000 rpm for 20 minutes. Thereafter, the resulting liquid layer portion was separated from the reaction solution by subjecting the solution to filtration treatment through a 5 μm-mesh membrane filter "Minisart" available from Sartorius Inc.

Four hundred grams of the resulting filtrate (carbon black: 68.6 g; water-insoluble polymer: 29.4 g) were mixed with 44.56 g of ion-exchanged water, and further mixed with 0.89 g of "Ploxel LVS" (mildew-proof agent; active ingredient content: 20%) available from Arch Chemicals Japan, Inc., followed by stirring the resulting mixture at 70° C. for 1 hour. The obtained reaction solution was cooled to 25° C., and then subjected to filtration treatment through the aforementioned 5 μm-mesh filter. Furthermore, the obtained filtrate solution was mixed with ion-exchanged water so as to adjust a solid content of the resulting mixture to 22% by mass, thereby obtaining a water dispersion of the pigment-containing water-insoluble polymer.

The average particle size of the pigment-containing water-insoluble polymer particles in the thus obtained water dispersion was 90 nm.

Production Examples 2 to 4

Production of Water Dispersions of Chromic Pigment-Containing Water-Insoluble Polymer Particles The same procedure as in Production Example 1 was repeated except that the carbon black "MONARCH717" used in Production Example 1 was replaced with a cyan pigment "Chromofine Blue 6338JC" (tradename; C.I. Pigment Blue 15:3) available from Dainichiseika Color & Chemicals Mfg. Co., Ltd., a magenta pigment "Chromofine Red 6114JC" (tradename; C.I. Pigment Red 122) available from Dainichiseika Color & Chemicals Mfg. Co., Ltd., and a yellow pigment "Fast Yellow 7414" (tradename; C.I. Pigment Yellow 74) available from Sanyo Color Works, Ltd., respectively, thereby obtaining water dispersions of the water-insoluble polymer particles respectively containing the cyan pigment, the magenta pigment and the yellow pigment.

Synthesis Example 2

Production of Pigment-Free Water-Insoluble Polymer Particles

A reaction vessel equipped with a dropping funnel was charged with 0.5 g of methacrylic acid, 14.5 g of methyl methacrylate, 5.0 g of 2-ethylhexyl acrylate, 11.1 g of "LATEMUL E118B" (sodium polyoxyethylenealkylethersulfate; surfactant) available from Kao Corporation, 0.2 g of potassium persulfate as a polymerization initiator available from Wako Pure Chemical Industries, Ltd., and 282.8 g of ion-exchanged water. The contents of the reaction vessel were mixed with each other, and an inside atmosphere of the reaction vessel was replaced with nitrogen gas, thereby obtaining an initially charged monomer solution. In addition, 9.5 g of methacrylic acid, 275.5 g of methyl methacrylate, 95.0 g of 2-ethylhexyl acrylate, 35.1 g of "LATEMUL E118B", 0.6 g of potassium persulfate and 183.0 g of ion-exchanged water were mixed with each other, thereby obtaining a dropping monomer solution. The thus obtained dropping monomer solution was charged into the dropping funnel, and an inside atmosphere of the dropping funnel was replaced with nitrogen gas.

In a nitrogen atmosphere, the initially charged monomer solution in the reaction vessel was heated from room temperature to 80° C. while stirring over 30 minutes, and while maintaining the initially charged monomer solution at 80° C., the dropping monomer solution in the dropping funnel was gradually added dropwise to the reaction vessel over 3 hours. After completion of the dropwise addition, the contents of the reaction vessel were stirred for 1 hour while maintaining the temperature thereof at 80° C. Then, the resulting reaction mixture was subjected to filtration treatment through a 200-mesh filter, thereby obtaining pigment-free water-insoluble polymer particles (solid content: 40% by mass; average particle size: 100 nm).

Preparation Example 1

Preparation of Water-Based Ink C1

The water dispersion of the carbon black-containing water-insoluble polymer particles obtained in Production Example 1 and the pigment-free water-insoluble polymer particles obtained in Synthesis Example 2, as shown in the following composition A were compounded with each other such that the contents of the pigment and the water-insoluble polymer particles in the resulting ink were 4% by mass and 2% by mass, respectively. The resulting mixed solution was subjected to filtration treatment using the aforementioned 5 μm-mesh filter, thereby obtaining a water-based ink C1 (black).

[Composition A1]

| | |
|---|---|
| Water dispersion containing carbon black (solid content: 22% by mass) | 26 g |
| Pigment-free water-insoluble polymer particles (copolymer of methyl methacrylate/2-ethylhexyl acrylate/methacrylic acid; solid content: 40% by mass; average particle size: 100 nm) | 5 g |
| Diethylene glycol (available from Wako Pure Chemical Industries, Ltd.) | 20 g |
| Propylene glycol (available from Wako Pure Chemical Industries, Ltd.) | 10 g |
| "SURFYNOL 104PG-50" (a propylene glycol solution of an acetylene glycol-based surfactant; active ingredient content: 50%) available from Nissin Chemical Co., Ltd. | 2 g |
| "EMALGEN 120" (polyoxyethylene lauryl ether) available from Kao Corporation | 2 g |
| 1N sodium hydroxide aqueous solution | 0.5 g |
| Furthermore, 34.5 g of ion-exchanged water was added to the aforementioned composition to adjust a total amount of the resulting solution to 100 g. | |

Preparation Examples 2 to 4

Preparation of Water-Based Inks C2 to C4

The same procedure as in Preparation Example 1 was repeated except that the water dispersion of the carbon black-containing water-insoluble polymer particles used in Preparation Example 1 was replaced with the respective water dispersions of the water-insoluble polymer particles containing the cyan pigment, the magenta pigment or the yellow pigment which were obtained in Production Examples 2 to 4, respectively, thereby obtaining a water-based ink C2 (cyan), a water-based ink C3 (magenta) and a water-based ink C4 (yellow).

Preparation Example 5

Preparation of Water-Based Composite Black Ink

The water-based inks obtained in Preparation Examples 1 to 4, i.e., the water-based ink C1 (black), the water-based ink C2 (cyan), the water-based ink C3 (magenta) and the water-based ink C4 (yellow), were compounded with each other in amounts of 10 g, 30 g, 30 g and 30 g, respectively, and the resulting mixture was subjected to filtration treatment through a 5 μm-mesh filter, thereby obtaining a water-based composite black ink.

Examples 1 to 3 and Comparative Examples 1 to 3

An ink set filled with the water-based composite black ink obtained in Preparation Example 5 as well as the water-based inks C2 (cyan), C3 (magenta) and C4 (yellow) obtained in Preparation Examples 2 to 4, respectively, was loaded to a print evaluation apparatus (refer to FIG. 1) available from IWATSU ELECTRIC CO., LTD., equipped with ink-jet printing line heads under the environmental conditions including a temperature of 25±5° C. and a relative humidity of 60±10%.

A label printing substrate "GLOSS PW 8K" (part number; surface-coated paper) available from Lintec Corporation was set to the paper feed roll 10 shown in FIG. 1, and subjected to ink-jet printing to form wet solid images having respective colors thereon. Immediately after conducting the ink-jet printing, the water-based inks on the printing substrate were dried by mid-infrared rays irradiated from the infrared heater 31 and fixed on the printing substrate, and then the printing substrate thus printed was wound up around the paper delivery roll 40.

The ink-jet printing conditions, etc., were as follows.
Ink ejection type of print head: piezoelectric type
Print head resolution: 600 dpi
Inside temperature of printing means: 35° C.
Number of infrared lamp heaters used: 2 to 6
Infrared irradiation conditions: rated voltage: 200 V; output: 500 to 1100 W; irradiation time: 1 to 6 seconds
Distance between respective infrared lamp heaters and printing substrate: 60 mm
Transportation speed: 6 to 25 m/min
Ink surface temperature: measured by a radiation thermometer "KEW5515" available from KYORITSU ELECTRICAL INSTRUMENTS WORKS LTD.

The color migration of characters or images printed with the water-based composite black ink on the finally obtained printed material as well as the deformation of the printing substrate were evaluated according to the following evaluation ratings. The evaluation results in association with the ink surface temperature at an outlet of the drying section C are shown in Table 2. The aforementioned ink-jet printing was conducted under the drying conditions (a) to (f) in which the number of the infrared lamp heaters, the infrared irradiation conditions and the transportation speed were controlled to the aforementioned respective ranges such that the temperature of the surface of the water-based composite black ink upon drying fell within the range of 80 to 130° C.

Examples of the drying conditions for setting the temperature of the surface of the water-based composite black ink at the outlet of the drying section C are as follows.
In the case of the drying conditions (d):
For example, by setting the transportation speed to 12.5 m/min, the number of the infrared lamp heaters to 6 and the output of the respective infrared lamp heaters to 800 W, it was possible to control the temperature of the surface of the water-based composite black ink to 110° C.

In the case of the drying conditions (e):

For example, by setting the transportation speed to 25 m/min, the number of the infrared lamp heaters to 6 and the output of the respective infrared lamp heaters to 1,100 W, it was possible to control the temperature of the surface of the water-based composite black ink to 120° C.

As described above, by suitably selecting a combination of the transportation speed, the number of the infrared lamp heaters and the output of the respective infrared lamp heaters, it was possible to control the temperature of the surface of the water-based composite black ink to the predetermined value.

Meanwhile, with respect to the respective water-based inks, i.e., the water-based inks C2 (cyan), C3 (magenta) and C4 (yellow), there were present no problems concerning color migration of the printed characters or images and deformation of the printing substrate, so that it was possible to obtain good printed materials.

(Evaluation of Color Migration on Printed Material)

A: No color migration to fingers occurred when rubbing the surface of the resulting printed material with the fingers, and no set-off of the ink to a rear side of a printing substrate thereof occurred after being taken up.

B: Although no color migration to fingers occurred when rubbing the surface of the resulting printed material with the fingers, slight set-off of the ink to a rear side of a printing substrate thereof after being taken up occurred, but the set-off posed no significant problems.

C: Slight color migration to fingers occurred when rubbing the surface of the resulting printed material with the fingers, and the set-off might pose certain problems in some cases.

D: Much color migration to fingers occurred when rubbing the surface of the resulting printed material with the fingers, and the surface of the printed material got wet to cause transfer of the ink to a printed surface thereof, and the transferred ink to the printed surface posed significant problems when used in practical applications.

(Evaluation of Deformation of Printing Substrate)

A: No deformation such as distortion, etc., of the resulting printed material was recognized when visually observed.

B: Although certain deformation such as distortion, etc., of the resulting printed material was present in some cases when visually observed, the shape of the printing substrate after being taken up posed no significant problems.

C: Slight deformation such as distortion, etc., of the resulting printed material was present when visually observed.

D: Much deformation such as distortion, etc., of the resulting printed material was present when visually observed, and the deformation posed significant problems when used in practical applications.

Comparative Examples 4 to 7

The same procedures as in Examples 1 to 3 and Comparative Example 3 were respectively repeated except that the water-based black ink C1 containing the carbon black solely obtained in Preparation Example 1 was used in place of the water-based composite black ink, thereby obtaining respective printed materials. The resulting printed materials were evaluated with respect to color migration and deformation of the printing substrate under the same drying conditions (c) to (f) as used in Examples 1 to 3 and Comparative Example 3, respectively. The results are shown in Table 3.

TABLE 3

Evaluation Results of Black Ink C1

|  |  | Comparative Examples | | | |
|---|---|---|---|---|---|
|  |  | 4 | 5 | 6 | 7 |
|  | Drying conditions | (c) | (d) | (e) | (f) |
| Evaluation results | Color migration | A | A | A | A |
|  | Deformation of printing substrate | D | D | D | D |

From Table 2, it was confirmed that in the ink-jet printing method using the water-based composite black ink according to the present invention, when the temperature of the surface of the ink at an outlet of the drying section C fell within the range of 95 to 125° C., it was possible to obtain the good printed materials that were free of color migration and deformation of the printing substrate.

On the other hand, from Table 3, it was confirmed that in the ink-jet printing method using the black ink C1 containing the carbon black solely, although no color migration occurred when conducted under the same drying conditions as used in Examples 1 to 3 in which the good printed materials were obtained, the respective printing substrates suffered from deformation, so that these Comparative Examples failed to obtain good printed materials.

INDUSTRIAL APPLICABILITY

In accordance with the ink-jet printing method of the present invention, it is possible to obtain a good printed

TABLE 2

Evaluation Results of Composite Black Ink

|  |  | Comparative Examples | | Examples | | | Comparative |
|---|---|---|---|---|---|---|---|
|  |  | 1 | 2 | 1 | 2 | 3 | Example 3 |
|  | Drying conditions | (a) | (b) | (c) | (d) | (e) | (f) |
|  | Temperature of surface of ink upon drying (°C.) | 80 | 90 | 100 | 110 | 120 | 130 |
| Evaluation results | Color migration | D | C | B | A | A | A |
|  | Deformation of printing substrate | A | A | A | A | A | C | material that is free of color migration and deformation of a printing substrate even when printed on a label printing substrate.

REFERENCE SIGNS LIST

1: Ink-jet printing apparatus;
A: Paper feed section; B: Printing section; C: Drying section; D: Paper delivery section;
10: Paper feed roll;
11: Printing substrate;
16: Preheater;
21: Printing means; 21a: Printing head
22: Suction box;
31: Infrared heater;
40: Paper delivery roll.

The invention claimed is:

1. An ink-jet printing apparatus comprising a printing means for ejecting a black ink to a printing substrate to print characters or images on the printing substrate, and a drying means disposed on a downstream side of a transportation direction of the printing substrate, in which:
the printing substrate is a label printing substrate;
the black ink is a water-based composite black ink;
the water-based composite black ink comprises a composite black pigment comprising carbon black, and a content of the carbon black in the composite black pigment is not more than 25% by mass; and
the drying means is an infrared heater for heating the water-based composite black ink to a temperature of not lower than 95° C. and not higher than 125° C.; and
wherein a transportation speed of the label printing substrate is not less than 6 m/min.

2. The ink-jet printing method according to claim 1, wherein the composite black pigment comprises a cyan pigment, a magenta pigment and a yellow pigment.

3. The ink-jet printing method according to claim 1, wherein a total content of the composite black pigment comprising the carbon black in the water-based composite black ink is not less than 2% by mass and not more than 20% by mass.

4. The ink-jet printing method according to claim 1, wherein the respective pigments constituting the composite black pigment in the water-based composite black ink comprises pigment particles formed by dispersing the pigment with a polymer.

5. The ink-jet printing method according to claim 1, wherein the water-based composite black ink comprises not less than 0.08% by mass and not more than 1% by mass of the carbon black, not less than 0.1% by mass and not more than 2% by mass of the cyan pigment, not less than 0.4% by mass and not more than 3% by mass of the magenta pigment, and not less than 0.4% by mass and not more than 2.5% by mass of the yellow pigment.

6. The ink-jet printing method according to claim 1, wherein the infrared heater is a mid-infrared lamp heater.

7. The ink-jet printing method according to claim 1, wherein the apparatus comprises a preheater for heating a surface of the label printing substrate to a temperature of not lower than 35° C. and not higher than 65° C., and the preheater is disposed on an upstream side of a position where characters or images are printed on the surface of the label printing substrate.

8. The ink-jet printing method according to claim 1, comprising the step of mixing a cyan ink, a magenta ink, a yellow ink and a black ink with each other to obtain the water-based composite black ink.

* * * * *